B. F. Ray.
Mower.
Nº 34,215. Patented Jan. 21, 1862.
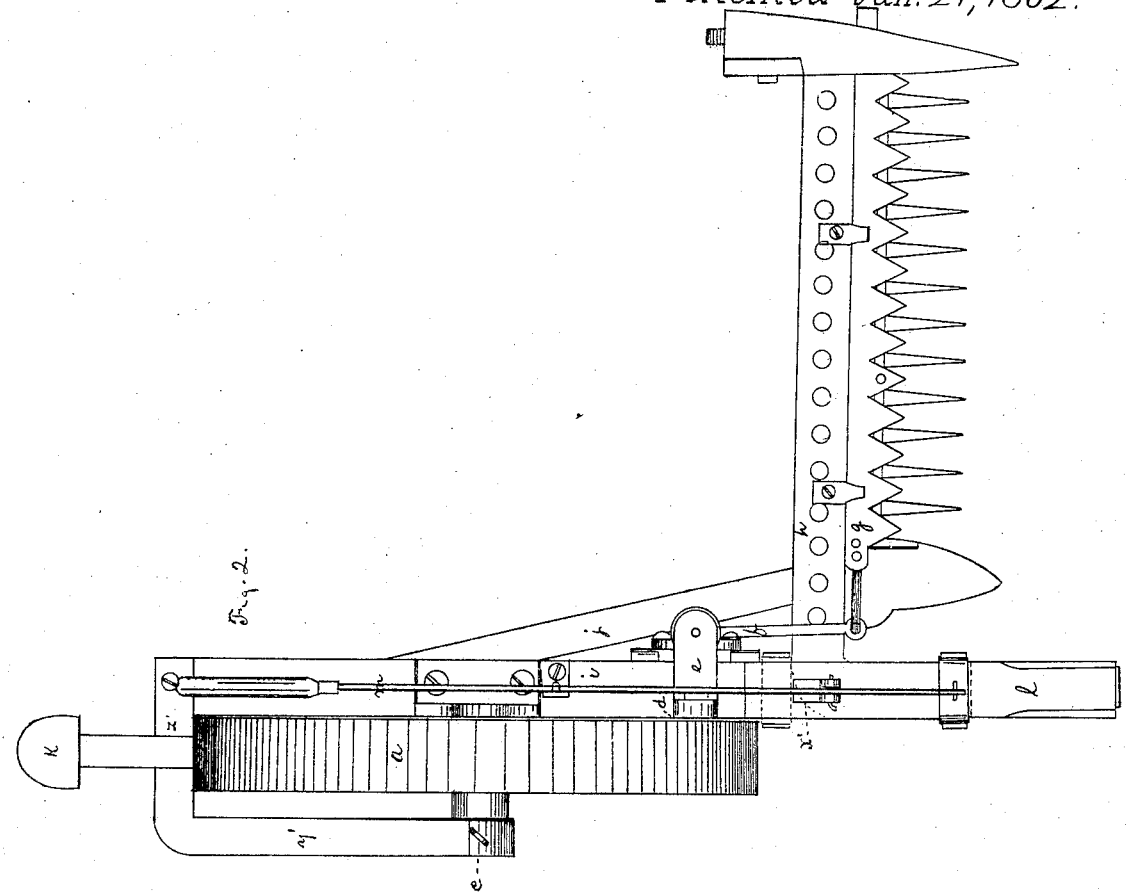
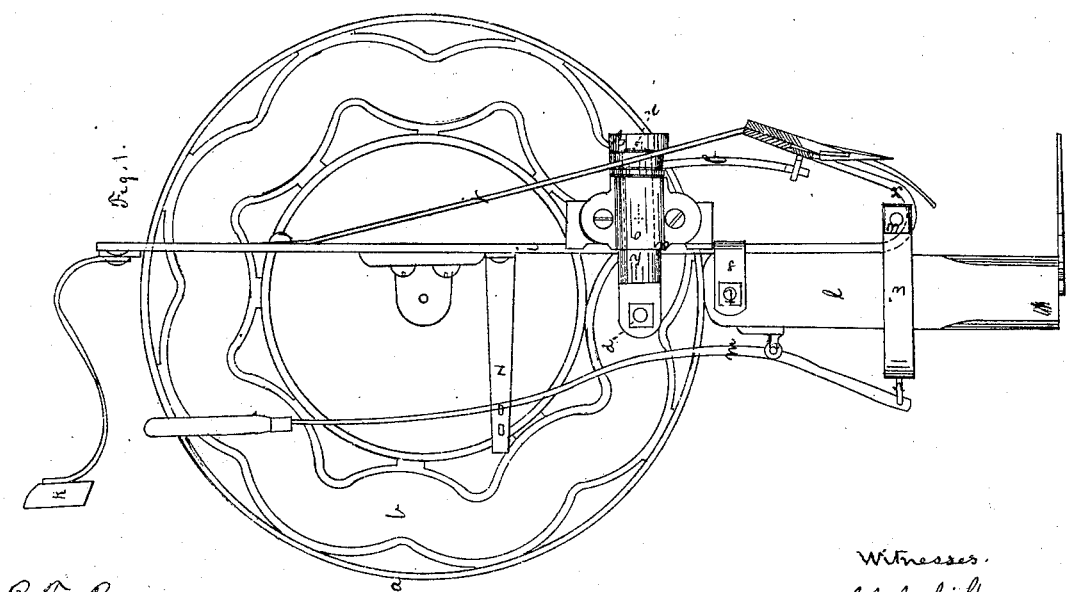
B. F. Ray, inventor
by atty Thos. T. Everett
Witnesses.
G. C. Lambright
J. Short 2nd

UNITED STATES PATENT OFFICE.

B. F. RAY, OF BALTIMORE, MARYLAND.

IMPROVEMENT IN HARVESTERS.

Specification forming part of Letters Patent No. 34,215, dated January 21, 1862.

*To all whom it may concern:*

Be it known that I, B. F. RAY, of the city of Baltimore, in the State of Maryland, have invented certain new and useful Improvements on Harvesters; and I do hereby declare the following to be a full, clear, and exact description thereof, reference being had to the accompanying drawings, and to the letters and marks thereon.

Although my improvements may be used, in part or in whole, upon other harvesters, they are specially applicable to that harvester on which a patent was granted to me on the 15th day of February, 1859.

The drawings forming part of this specification represent the harvester of the patent here referred to with my present improvements affixed thereto.

Of these drawings, Figure 1 is a side view of the machine, looking toward the inner surface of the main or power wheel; and Fig. 2, a top view, or a view looking down upon the machine.

In each of these figures where like parts are shown like letters and marks are used to indicate the parts.

On these drawings the main or power wheel is marked $a$; the cam-groove in the inner surface of the wheel, $b$; the shaft of the frame in the center of the wheel, $c$; the friction-roller, $d$; the crank-arm of the friction-roller, $e$; the rocker-shaft indicated by dotted lines in Fig. 1 ; the arm connecting the cutter-bar to the rocker-shaft, $f$; the cutter-bar, $g$; the frame of the cutter-bar, $h$; the main bar of the frame, $i$; the brace between the main bar and the bar of the cutter-frame, $j$; the driver's seat $k$, and the lever for operating the frame of the cutter-bar $m$, the tongue being marked $l$.

In the machine of the patent above alluded to, as also in that of this application, the cutter-bar derives its motions by the rotation of the main or power wheel, the cam-groove of which actuates the rocker-shafts through the intervention of the friction-roller and its crank-arm, and the rocker-shaft operating the cutter-bar by the connecting-arm $f$. In the machine of the patent the friction of the rocker-shaft is entirely upon the upper part, $n$, of the supporting-collar $o$, which is attached to the frame-bar of the machine, the head $p$ of the rocker-shafts bearing upon this point of the collar. Finding this arrangement detrimental to the easy working and wear of these parts, I remedy the difficulty by adding to the lower part of the supporting-collar a step, $q$, wherein is a bearing for the lower end, $r$, of the rocker-shaft, and I thus relieve the upper part of the collar of a part of the friction, and give these parts easier and smoother motion. This step may be permanently attached to the lower part of the collar, or it may be screwed thereto. This latter named way of attaching it will allow of its being adjusted and thus adapted to the wear of the parts, as also of throwing upon the head of the collar a greater or less amount of friction as may be desirable. In the machine of this application I have also a different arrangement of means from that of the machine of the patent for elevating and lowering the cutter-bar and its frame. The tongue $l$ is connected to the frame of the machine by a band, $s$, and bolt $t$, and nut, the rear end of the tongue being rounded off thus, making a joint of some motion. Another band, $u'$, attached at its upper end by a hook, $v$, to the front end of the lever $m$, embraces the tongue, and by a movable joint, $w$, is connected to the curved part $x$ of the frame-bar $i$. The lever $m$ is also connected to the rear end of the tongue by a movable joint, $y$. The lever extends back to the driver's seat, and has the usual standard, $z$, for holding it in the position desired. By this arrangement of means the cutter-bar and its frame can readily be raised or lowered while the machine is in motion, and be entirely under the control of the driver in his seat.

The frame of this machine is attached to the main wheel at one point only—at the center of the wheel and by the shaft. A cross-bar, $z'$, at the end of the frame-bar supports the driver's seat. From this cross-bar a spring-bar, $y'$, passes forward, and rests upon the outer axle-bearing of the wheel. This spring-bar and cross-bar may be of one continuous piece with the frame-bar, or of two pieces, as may be preferred. The spring-bar gives elasticity to the back end of the frame-bar and to the driver's seat, while it supports to some extent both. The frame-bar $i$ and the bar of the cutter's frame $h$, I make, as is shown by the drawings, of one continuous piece, curving it downward and backward, as at $x$, and again curving it laterally at $x'$. If made of wrought metal, the whole may readily be worked into the necessary form. If a part be made of malleable cast-iron, by riveting or other well-known means the pieces may be made continuous. When made of one piece, the expense of the whole will be less than when made, as is usual, of separate and distinct pieces. By having the curving of the continuous bar at the point shown, $x$, a sufficient degree of elasticity exists to allow of the machines being protected from injury by the frame of the cutter-bar coming in contact with stones or other hard substances, which, without such curve, would break or injure the machine.

What I claim as my invention, and desire to secure by Letters Patent, is—

1. Making the frame-bar and the frame of the cutter-bar of one continuous piece, having the curved part $x$, as described.

2. The arrangement of the bearings and boxes of the rocker-shaft, in combination with the friction-roller and cam-groove, as described.

B. F. RAY.

Witnesses:
WILLIAM BEAM,
FREDERICK ETCHISON.